United States Patent
LaGraff et al.

(10) Patent No.: US 6,605,258 B2
(45) Date of Patent: Aug. 12, 2003

(54) HIGH THROUGHPUT SCREENING METHOD, ARRAY ASSEMBLY AND SYSTEM

(75) Inventors: John Robert LaGraff, Nishayuna, NY (US); Xiao-Dong Sun, Schenectady, NY (US); James Anthony Ruud, Delmar, NY (US); James Claude Carnahan, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/126,349

(22) Filed: Apr. 22, 2002

(65) Prior Publication Data

US 2002/0115221 A1 Aug. 22, 2002

Related U.S. Application Data

(62) Division of application No. 09/666,381, filed on Sep. 20, 2000, now Pat. No. 6,420,178.

(51) Int. Cl.[7] .................................................. B01L 3/00
(52) U.S. Cl. ...................... 422/102; 422/196; 422/255; 422/261
(58) Field of Search .......................... 436/12, 5, 6, 174; 422/255, 201, 264, 196

(56) References Cited

U.S. PATENT DOCUMENTS

| | | | | |
|---|---|---|---|---|
| 3,631,576 A | * | 1/1972 | Law et al. ..................... | 445/47 |
| 4,665,008 A | * | 5/1987 | Nishiura et al. ............ | 430/314 |
| 5,143,854 A | | 9/1992 | Pirrung et al. | |
| 5,575,858 A | | 11/1996 | Chen et al. | |
| 5,685,917 A | | 11/1997 | Sangeeta | |
| 5,695,659 A | | 12/1997 | Dickie | |
| 6,171,345 B1 | | 1/2001 | Convents et al. | |

OTHER PUBLICATIONS

Mendoza et al., "High–throughput microarray–based enzyme–linked immunosorbet assay (ELISA)", Bio Techniques (1999), 27(4), 778, 780, 782–788 (Abstract).

* cited by examiner

*Primary Examiner*—Jill Warden
*Assistant Examiner*—Yelena Gakh
(74) *Attorney, Agent, or Firm*—Noreen C. Johnson; Philip D. Freedman

(57) ABSTRACT

A liquid chemical stripping or cleaning solution is selected by combinatorial high throughput screening. A high throughput screening well array assembly includes (A) a metal substrate and (B) a mask that defines an array of wells on the substrate. A combinatorial high throughput screening system includes (A) a metal substrate and (B) a mask that defines an array of wells on the substrate and a reaction vessel to receive the well array assembly.

9 Claims, 8 Drawing Sheets

FIG. 12

| 96 well plate array | acid 1 | acid 2 | acid 1 + surfactant | acid 2 + surfactant | acid 1 + inhibitor | acid 2 + inhibitor | acid 1 + acid 2 | acid 1 + acid 2 + surfactant | acid 1 + acid 2 + inhibitor | acid 1 + inhibitor + surfactant | acid 2 + inhibitor + surfactant |
|---|---|---|---|---|---|---|---|---|---|---|---|---|
| | 1 | 2 | 3 | columns 4 | 5 | 6 | 7 | 8 | 9 | 10 | 11 | 12 |
| rows (conc.) 1 | 10% Phos | 10% HFS | 30% Phos 0.5% Plur | 30% HFS 0.5% Plur | 30% Phos 0.5% Rod | 30% HFS 0.5% Rod | 5% Phos 5% HFS | 20% Phos 30% HFS | 20% Phos 20% HFS 0.5% Plur | 20% Phos 20% HFS 0.5% Rod | 30% Phos 0.5% Plur 0.5% Rod | 30% HFS 0.5% Plur 0.5% Rod |
| 2 | 20% Phos | 20% HFS | 30% Phos 1% Plur | 30% HFS 1% Plur | 30% Phos 1% Rod | 30% HFS 1% Rod | 10% Phos 10% HFS | 20% Phos 40% HFS | 20% Phos 20% HFS 1% Plur | 20% Phos 20% HFS 1% Rod | 30% Phos 1% Plur 1% Rod | 30% HFS 1% Plur 1% Rod |
| 3 | 30% Phos | 30% HFS | 30% Phos 2% Plur | 30% HFS 2% Plur | 30% Phos 2% Rod | 30% HFS 2% Rod | 10% Phos 20% HFS | 30% Phos 10% HFS | 20% Phos 20% HFS 2% Plur | 20% Phos 20% HFS 2% Rod | 30% Phos 1% Plur 2% Rod | 30% HFS 1% Plur 2% Rod |
| 4 | 40% Phos | 40% HFS | 30% Phos 3% Plur | 30% HFS 3% Plur | 30% Phos 3% Rod | 30% HFS 3% Rod | 10% Phos 30% HFS | 30% Phos 20% HFS | 20% Phos 20% HFS 3% Plur | 20% Phos 20% HFS 3% Rod | 30% Phos 1% Plur 3% Rod | 30% HFS 1% Plur 3% Rod |
| 5 | 50% Phos | 50% HFS | 30% Phos 4% Plur | 30% HFS 4% Plur | 30% Phos 4% Rod | 30% HFS 4% Rod | 10% Phos 40% HFS | 30% Phos 30% HFS | 20% Phos 20% HFS 4% Plur | 20% Phos 20% HFS 4% Rod | 30% Phos 2% Plur 1% Rod | 30% HFS 2% Plur 1% Rod |
| 6 | 60% Phos | 60% HFS | 30% Phos 5% Plur | 30% HFS 5% Plur | 30% Phos 5% Rod | 30% HFS 5% Rod | 10% Phos 50% HFS | 40% Phos 10% HFS | 20% Phos 20% HFS 5% Plur | 20% Phos 20% HFS 5% Rod | 30% Phos 2% Plur 2% Rod | 30% HFS 2% Plur 2% Rod |
| 7 | 70% Phos | 70% HFS | 30% Phos 6% Plur | 30% HFS 6% Plur | 30% Phos 6% Rod | 30% HFS 6% Rod | 20% Phos 10% HFS | 40% Phos 20% HFS | 20% Phos 20% HFS 6% Plur | 20% Phos 20% HFS 6% Rod | 30% Phos 3% Plur 1% Rod | 30% HFS 3% Plur 1% Rod |
| 8 | 80% Phos | 80% HFS | 30% Phos 10% Plur | 30% HFS 10% Plur | 30% Phos 10% Rod | 30% HFS 10% Rod | 20% Phos 20% HFS | 50% Phos 10% HFS | 20% Phos 20% HFS 10% Plur | 20% Phos 20% HFS 10% Rod | 30% Phos 5% Plur 1% Rod | 30% HFS 5% Plur 5% Rod |

Phos = phosphoric acid (85%)   HFS = hydrofluorosilicic acid   Plur = Plurafac (surfactant)   Rod = Rodine (inhibitor)

HIGH THROUGHPUT SCREENING METHOD, ARRAY ASSEMBLY AND SYSTEM

This application is a division of application Ser. No. 09/666,381, filed Aug. 20, 2000, now U.S. Pat. No. 6,420,178, issued Jul. 16, 2002.

BACKGROUND OF THE INVENTION

The present invention relates to a high throughput screening (HTS) method, array assembly and system. Particularly, it relates to a method, assembly and system to identify a chemical stripping or cleaning solution.

A typical gas turbine engine includes a compressor, a combustor and a turbine. Gases flow axially through the engine. Compressed gases emerging from the compressor are mixed with fuel and burned in the combustor. Hot products of combustion emerge from the combustor at high pressure and enter the turbine where thrust is produced to propel the engine and to drive the turbine, which in turn drives the compressor.

The compressor and the turbine include alternating rows of rotating and stationary coated airfoils. High temperature combustion gases degrade the coatings through either hot corrosion or oxidation. Gases that circulate through the airfoils, particularly during operation on the ground, also include particles of sand, dust, oxides of calcium, magnesium, aluminum, silicon and mixtures that have been ingested by the engine. The oxides can combine to form particularly deleterious calcium-magnesium-aluminum-silicon-oxide systems (Ca—Mg—Al—Si—O), referred to as CMAS. These contaminants can be in a molten state and can infiltrate pores and openings in engine parts that can lead to crack formation and part failure. Other contaminants may include iron and nickel oxides, sodium vanadates, sodium sulfates, sodium phosphates and the like.

Consequently, gas turbine components such as an airfoil must be periodically repaired by removing degraded coatings, mechanically repairing the airfoil and recoating the airfoil surface. Removal of the degraded coating can be accomplished through one or more chemical stripping or cleaning immersions. Repair of turbine engine parts can also involve cleaning cracks, crevices and surfaces to completely remove CMAS and other oxides, organic and inorganic impurities and dirt prior to alloy filling and brazing. A typical repair process consists sequentially of a dirt clean, coating strip, then a fluoride ion cleaning (FIC) or etching prior to weld/braze repair.

Current cleaning/stripping solutions are not as effective and selective as desired. Also, new stripping solutions must often be developed when new base metal airfoils are developed or when the airfoils are provided with new coatings. Typically, "one-at-a-time" experiments are used to identify a new solution. In these experiments, scrapped engine-run airfoil pieces are placed in a beaker of solution and immersed in a hot water bath. The solution can be evaluated for stripping or cleaning effectiveness first by visual inspection and then by cross-sectional microscopy of cut and polished pieces. This process is time consuming. Sometimes, several months of work is involved to screen a few dozen solutions at most and then to optimize one promising solution. Part-to-part and intrapart coating variability can complicate the evaluation process. The stripping of a solution on a different cut part piece can be difficult to determine from sample piece to sample piece. This can result in elimination of a promising solution too early in the screening process. There is a need for a method to rapidly and efficiently screen large numbers of chemical solutions for stripping or cleaning of an airfoil.

BRIEF SUMMARY OF THE INVENTION

The invention incorporates a combinatorial chemistry approach to screening and optimizing solution mixtures for chemical stripping or cleaning of a gas turbine component coating. The method comprises selecting a gas turbine component chemical stripping or cleaning solution by combinatorial high throughput screening (CHTS).

In another embodiment, the invention relates to a method, comprising assembling a mask onto a test substrate to define a well array on the test substrate, establishing a combinatorial library of candidate liquid reactants by depositing a candidate liquid reactant into each well of the array in contact with a region of the substrate, effecting reaction of each candidate liquid reactant with the substrate and evaluating each region of the substrate to select a best reactant from among the candidate liquid reactants.

In another embodiment, the invention relates to a high throughput screening well array assembly. The assembly comprises (A) a metal substrate and (B) a mask that defines an array of wells on the substrate.

In still another embodiment, the invention relates to a combinatorial high throughput screening system. The system includes a well array assembly comprising (A) a metal test substrate and (B) a mask that defines an array of wells on the substrate and a reaction vessel to receive the well array assembly.

BRIEF DESCRIPTION OF THE DRAWINGS

FIG. 2 is a schematic representation of a single well design;

FIG. 3 is a top view of a cleaning/stripping pattern under a single well;

FIG. 12 is a table showing a 96 member stripping solution experimental space and results.

DETAILED DESCRIPTION OF THE INVENTION

Figure 1:
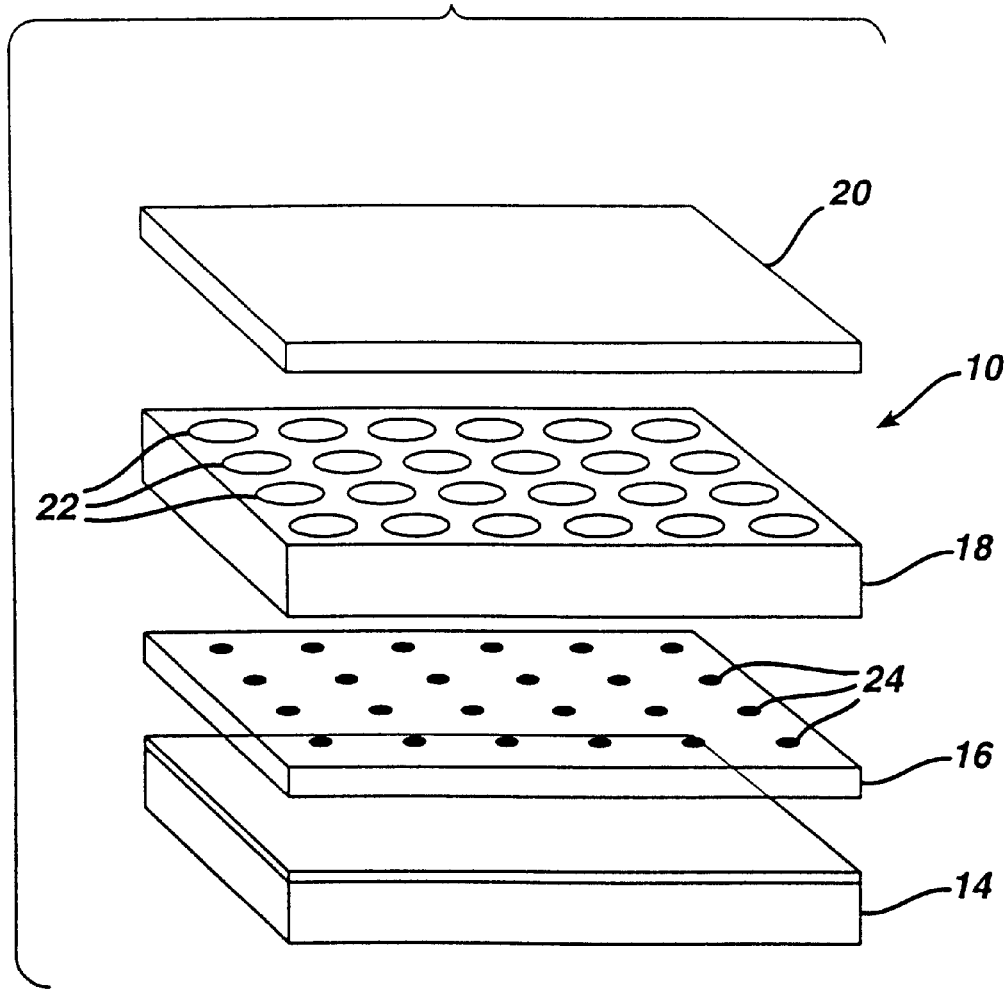
FIG. 1 is an exploded schematic representation of a multilayer well assembly.

In experimental reaction systems, each potential combination of reactant, catalyst and condition must be evaluated in a manner that provides correlation to performance in a production scale reactor Combinatorial organic synthesis (COS) is a high throughput screening (HTS) methodology that was developed for pharmaceuticals. COS uses systematic and repetitive synthesis to produce diverse molecular entities formed from sets of chemical "building blocks." As with traditional research, COS relies on experimental synthesis methodology. However instead of synthesizing a single compound, COS exploits automation and miniaturization to produce large libraries of compounds through successive stages, each of which produces a chemical modification of an existing molecule of a preceding stage. The libraries comprise compounds that can be screened for various activities.

The technique used to prepare such libraries involves a stepwise or sequential coupling of building blocks to form the compounds of interest. For example, Pirrung et al., U.S. Pat. No. 5,143,854 discloses a technique for generating arrays of peptides and other molecules using, for example, light-directed, spatially-addressable synthesis techniques. Pirrung et al. synthesizes polypeptide arrays on a substrate by attaching photoremovable groups to the surface, of the substrate, exposing selected regions of the substrate to light to activate those regions, attaching an amino acid monomer with a photoremovable group to the activated region, and repeating the steps of activation and attachment until polypeptides of desired lengths and sequences are synthesized.

Typically, a combinatorial high throughput screening method (CHTS) is characterized by parallel reactions at a micro scale. In one aspect, CHTS can be described as a method comprising (A) an iteration of steps of (i) selecting a set of reactants; (ii) reacting the set and (iii) evaluating a set of products of the reacting step and (B) repeating the iteration of steps (i), (ii) and (iii) wherein a successive set of reactants selected for a step (i) is chosen as a result of an evaluating step (iii) of a preceding iteration.

The present invention relates to a combinatorial chemistry approach to screening and optimizing solution mixtures for chemical cleaning and stripping of airfoil coatings. The CHTS can comprise (A) steps of (i) selecting a candidate stripping or cleaning solution; (ii) effecting stripping or cleaning of a metal substrate with the solution under a selected reaction condition; and (iii) evaluating a product of the stripping or cleaning step; and (B) reiterating (A) wherein a successive solution or condition selected for a step (i) or step (II) is selected as a result of an evaluating step (iii) of a preceding iteration of a step (A)

The CHTS can comprise steps of preparing a metal test substrate, assembling a mask that defines a well array onto the substrate, depositing a candidate airfoil chemical stripping or cleaning solution into a well of the array in contact with a region of the substrate to effect stripping or cleaning of the region and evaluating a product of the stripping or cleaning.

These and other features will become apparent from the drawings and following detailed discussion, which by way of example without limitation describe preferred embodiments of the present invention.

Figure 2:
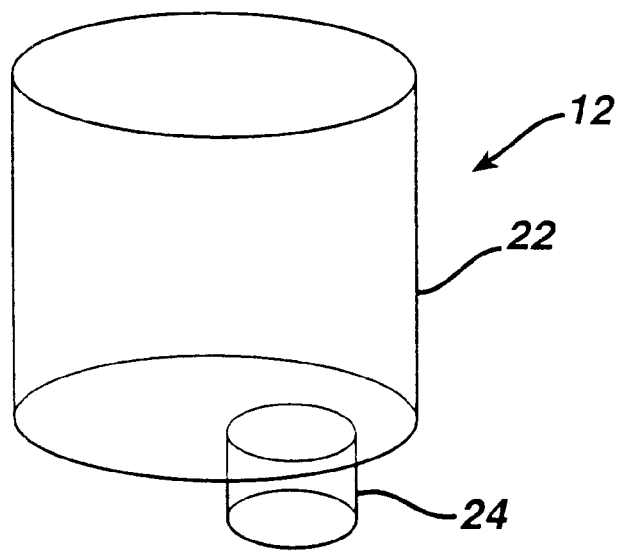
FIG. 2 is a schematic representation of a well design.
Figure 3:
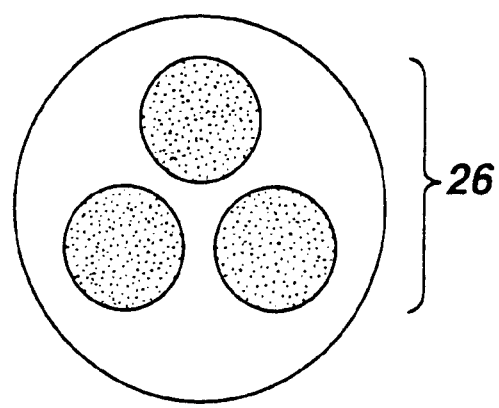
FIG. 3 is a top view of a cleaning/stripping pattern.

FIG. 1 is a schematic representation of a multilayer well array assembly 10 and FIG. 2 is a schematic representation of a single well from 10. In FIG. 1, a flat metal coupon base 14 is provided upon which a coating and/or dirt is deposited. The base 14 is furnace cycled to reproduce engine-run conditions on a specimen coupon or the base is a selected coupon section of an engine-run gas turbine component. As shown in FIG. 1, the multilayer well array assembly 10 includes the base 14, a contact well mask 16, reservoir array plate 18 and lid 20. Contact well mask 16 can be fabricated from rubber, plastic, teflon® material, photoresist, or other suitable material. FIG. 1 shows contact well mask 16 with an array of contact wells 24 and the reservoir array plate 18 with an array of reservoir wells 22. The reservoir well 22 contains a bulk of the stripping or cleaning solution. The contact wells 24 are shown with uniform cross-sections. However, the contact wells 24 can represent different cross-sections. The multilayer well array assembly 10 can accommodate replaceable contact well masks 16 with different shaped or positioned contact wells 24 to form various shaped or positioned contact areas 26 as shown in FIG. 3. In addition, the well mask 16 can be flexible to accommodate different contact areas or slight curvatures or surface roughnesses of the metal coupon base 14.

Finally, lid 20 is provided to prevent solution evaporation and spillage. Lid 20 can have pinholes or the like located above each well to avoid pressure build-up from evolved gases. To enhance the sealing of the wells to substrate, hydrophobic agents such as wax or silicone RTV, can be applied to seal a reservoir 18 and contact well mask 16 to a base 14. Additionally, lid 20 and contact well mask 16 can each be provided with a raised lip for sealing with a complementary structure. The base 14, well mask 16, array plate 18 and lid 20 are fitted together as shown in FIG. 1 to form the composite multilayer well array assembly 10.

FIG. 2 shows a contact well that has a high well 22 volume-to-contact-surface-area ratio. In FIG. 2, a resevoir well 22 is shown atop a contact well 24. A ratio of reservoir well 22 volume and contact well 24 area required to avoid solution depletion can be estimated from a coating composition of the metal base and thickness to be removed. For example, 5 moles of HCl are theoretically required to dissolve a mole of a NiAl coating according to the following two reactions.

$Ni(s)+2H^+ \leftrightarrows Ni^{2+}(aq)+H_2(g)$

$Al(s)+3H^+ \leftrightarrows Al^{3+}(aq)+H_2(g)$

Figure 7:
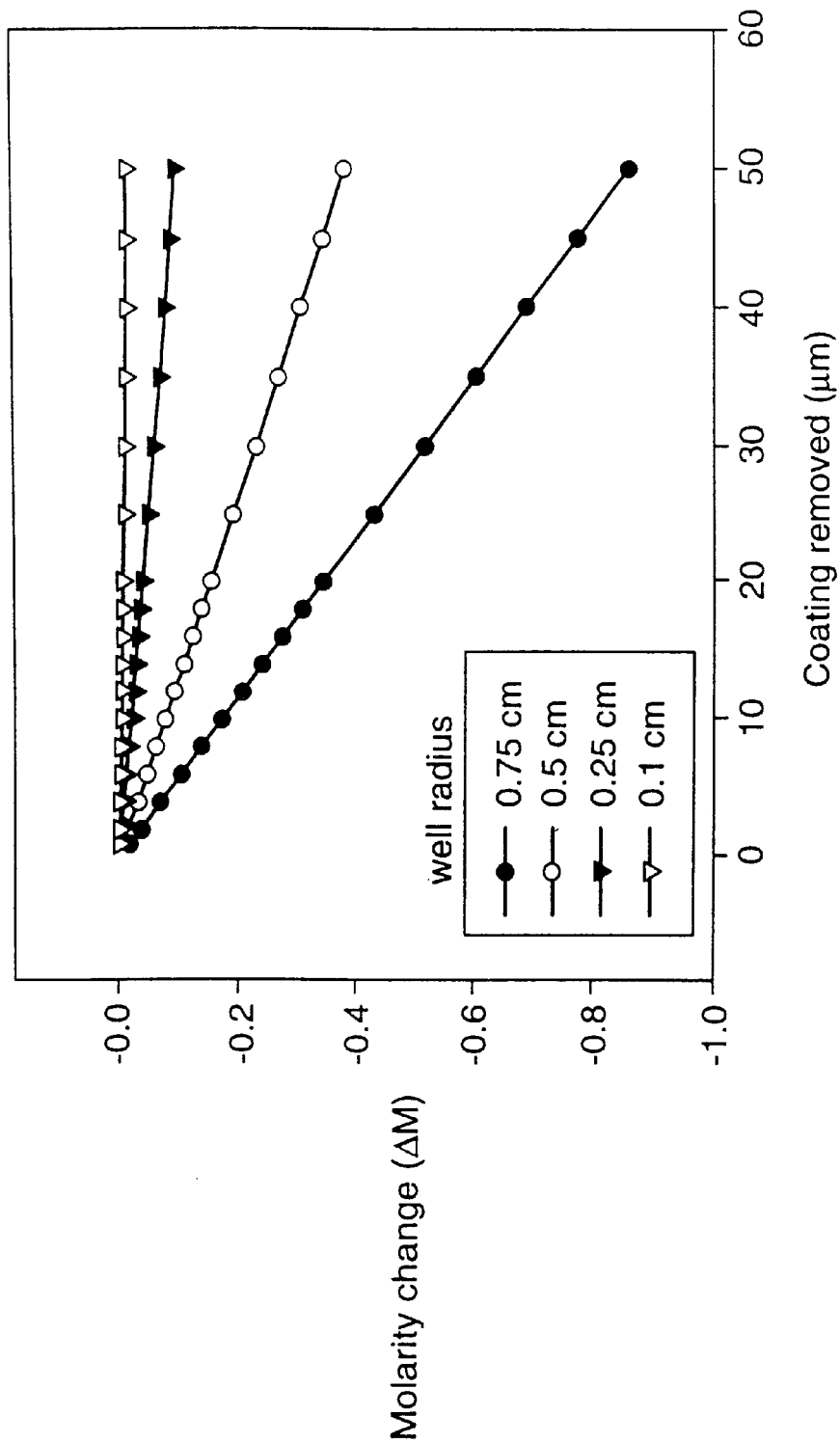
FIG. 7 is a graph of molarity change as a function of NiAl coating removal and contact area (mask radius) for a constant well volume of 3.5 ml.

A reservoir well 24 size can be estimated by molarity change of HCl as a function of coating removed (in microns of thickness). FIG. 7 shows molarity change as a function of NiAl coating removal and contact area (well radius). Percent solution depletion is reduced for large solution concentrations, large well volumes, thin coatings and small contact areas. For example, a 3M HCl solution becomes a 2.6M solution after 25 microns of coating are removed using a contact well radius equal to reservoir well radius (0.75 cm). Shrinking the contact well radius to 0.25 cm (while maintaining a 3.5 ml reservoir well volume) results in almost no change in the solution molarity.

Figure 4:
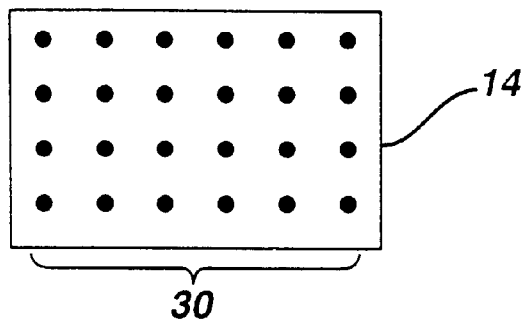
FIGS. 4, 5 and 6 are top views of a metal coupon substrate after three sequential experiments using the well design of FIGS. 1, 2 and 3.
Figure 5:
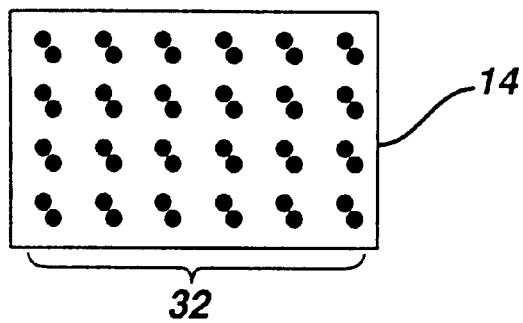
Figure 6:
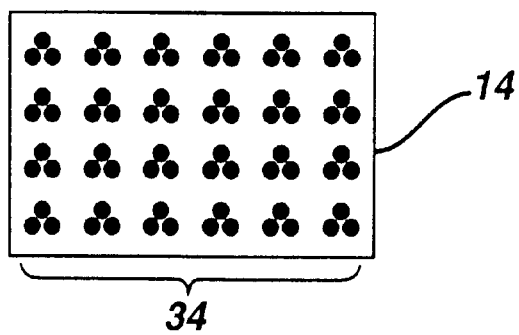

As described above, the multilayer well array assembly 10 can include a contact well mask 16 that permits varying a location of the contact well 24 within the area of a larger well reservoir well 22. FIG. 3 is a top view of a cleaning/stripping pattern 26 that can be imposed by using three separate contact well masks 16. Additionally, a contact mask 16 may be provided that is replaceable. FIGS. 4, 5 and 6 are schematic representations of stripping patterns after different contact well masks are used to isolate contact of different stripping or cleaning solutions with metal coupon base 14. In this embodiment, a mask 16 that defines a first contact area for a first iteration of a selection method can be replaced by a second mask that defines a second contact area for a next iteration of the selection method. For example, FIG. 4 illustrates a stripping or cleaning pattern 30 on a metal coupon base 14 that is determined by a contact area of a first mask 16 in a first iteration of the method. Then the first mask is replaced by a second mask for a second iteration of the method. The second mask provides a contact area that is different from the contact area of the first mask. FIG. 5 illustrates a stripping or cleaning pattern 32 on metal coupon base 14 after the second iteration of the method. The FIG. 5 shows a side by side stripping pattern from stripping of the first and second iteration. Then the second mask is replaced by a third mask for a third iteration of the method to provide the stripping or cleaning pattern 34 shown in FIG. 6.

In this manner, a single metal coupon base 14 can be used in reiterations of the method of the invention to select a suitable gas turbine component chemical stripping or cleaning solution. For example, a resevoir array plate 18 with large reservoir wells 22 in combination with 3 different contact well plates; can be used to define 72 (3×24) different cleaning and stripping experiments on a single coupon base 14. In one embodiment, different solutions can be used in the reservoir wells 22. In another embodiment, the same solution is used in a specific reservoir during successive experiments with a different contact well mask and varying time or temperature.

Figure 8:
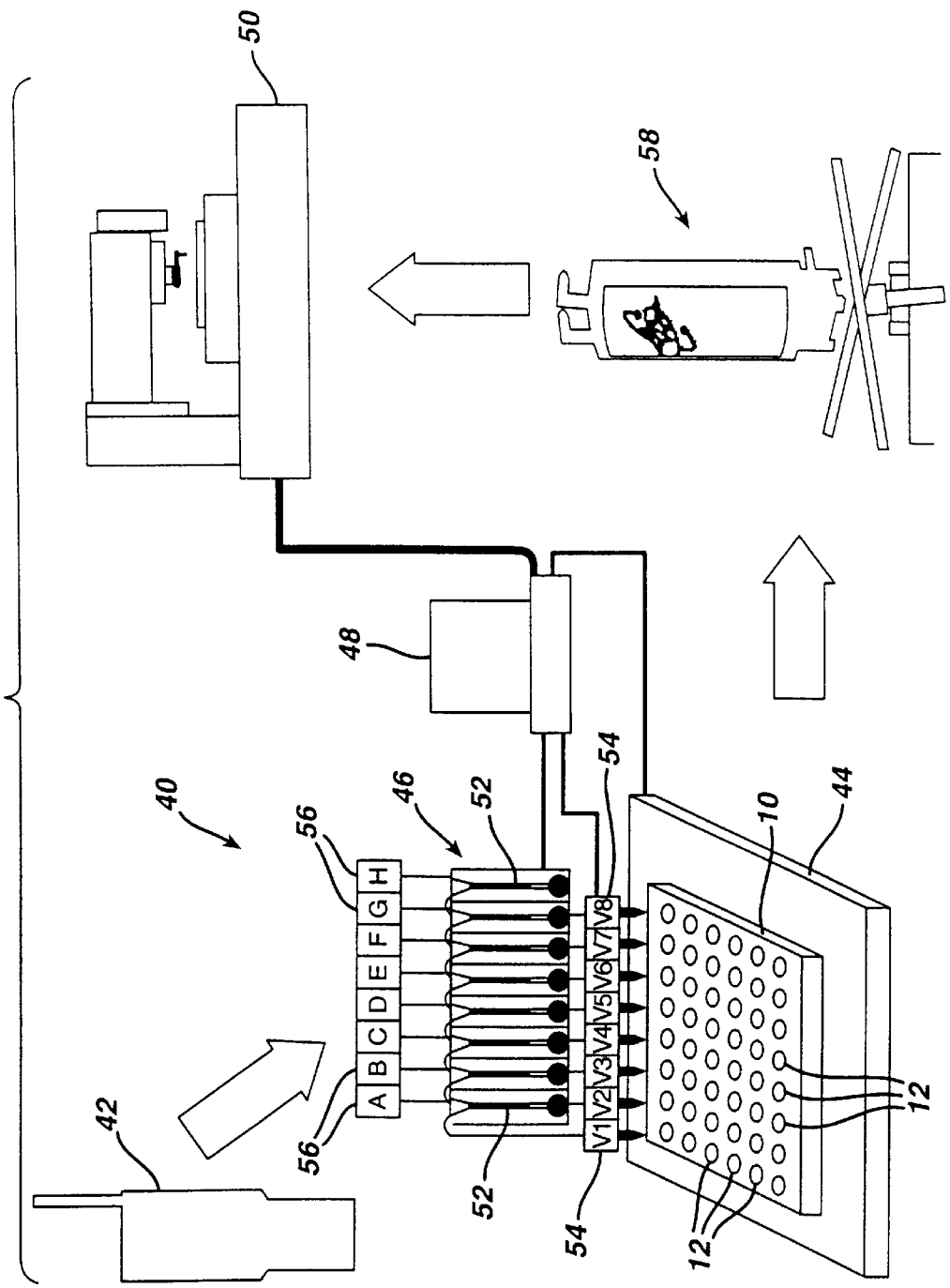
FIG. 8 is a schematic representation of a method and system to select a stripping solution.

FIG. 8 is a schematic representation of a system 40 of the invention to select a stripping solution. The system 40 includes furnace 42 to simulate engine-run conditions on a test coupon, array assembly 10 (shown without lid 20), X-Y positioning stage 44, solution dispensing system 46, controller 48, agitator/heater 58 and evaluator 50. The dispensing system 46 includes pipettes 52 and valves 54 used in conjunction with an array of wells 12 of multilayer well array assembly 10 (without lid 20) and solution dispensing containers 56. X-Y positioning stage 44 positions the array of wells 12 beneath a line of pipettes 52 for delivery of test solutions from reagent containers 56.

Figure 9:
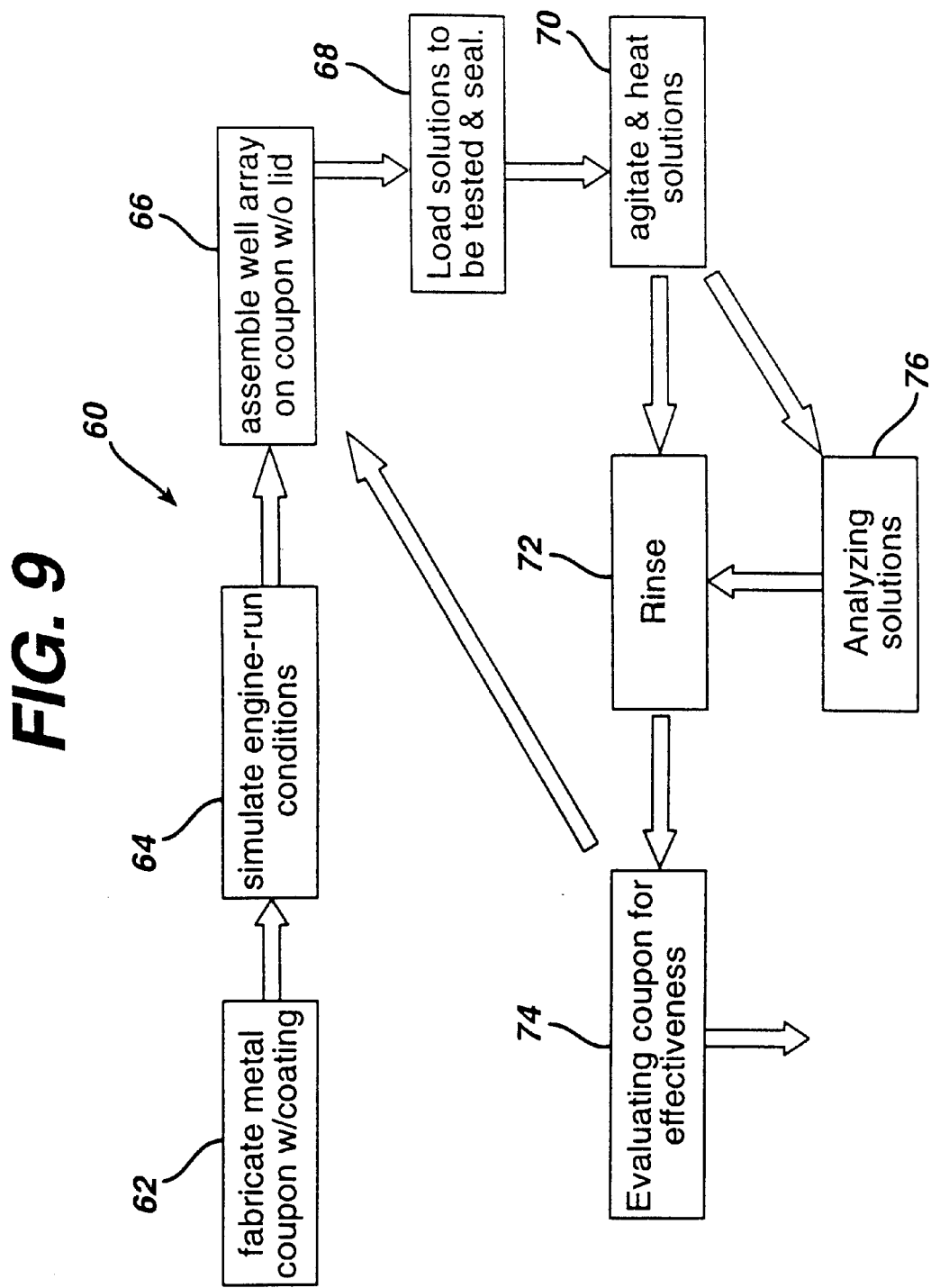
FIG. 9 is a schematic representation of another method to select a stripping solution.

With reference to FIG. 8 and FIG. 9, a method 60 for selecting a stripping or cleaning solution can comprise preparing 62 a coated test coupon base 14 by applying a coating to a substrate. Examples of substrates include NiAl, PtAl, MCrAlY, yttrium-stabilized zirconia, chromides, etc. Examples of substrates (or base metals) include Ni-based superalloys in both equiaxed and single crystal form, such as Rene N5, GTD111, etc, and Co-based alloys such as FSX414. The coated coupon is treated 64 to simulate engine run conditions. Treating step 64 can be a furnace annealing, furnace cycling (i.e., repeated heating and cooling) or a burner rig test, which involves cyclic exposure to hot combustion gas impingement. Generally the treating step 64 is carried out in an apparatus such as a furnace generally designated 42 in FIG. 8.

The well array assembly is then assembled 66 except for lid 20. Then candidate stripping or cleaning solutions are loaded 68 into respective wells 12 of the array assembly 10. The solutions can be automatically dispensed by means of any suitable dispenser such as an inkjet. Preferably, the solutions are dispensed by the arrangement of FIG. 8. In operation, successive lines of wells 12 are positioned beneath line of pipettes 52 by positioning stage 44, which is controlled by controller 48. Controller 48 can be a computer, microprocessor or the like. Controller 48 also controls valves 54 and pipette selection of solution from containers 56. The controller actuates stage 44 to position a line of wells 12 beneath the pipettes 52. A combination of solutions is selected from containers 56 according to the controller 48 and is delivered to each pipette 52. When the line of pipettes 52 is loaded, the controller actuates valves 54 for delivery of test solution to respective wells 12. The controller 48 records the composition of each solution and its position within the array of wells 12. The controller 48 then actuates stage 44 to position a next line of wells 12 beneath the pipettes 52. The method is repeated until each well 12 is loaded with test solution. The array assembly 10 is then covered by lid 20 and sealed.

The solutions in the sealed array assembly 10 are agitated and heated 70 by means of agitator/heater generally designated 58. Agitator/heater 58 can be can be an automatic rocker placed in an oven, ultrasonically agitated hot water bath or IR lamp in combination with a rocker that agitates and maintains the temperature of the array assembly 10 and solution for a set period of time. For example, agitating/heating 70 can be continued for a period of about 5 minutes to greater than 24 hours, desirably about 30 minutes to 8 hours and preferably about 30 minutes to 4 hours at a temperature of about 25° C. to 200° C. desirably about 25° to 100° C. and preferably about 50° C. to 80° C. After agitating and heating 70, the array assembly 10 can be disassembled and rinsed 72. Rinsing step 72 preferably comprises repeated hot water immersions or spray water rinses. In an embodiment, step 72 can utilize a short time caustic rinse to neutralize residual acids followed by a hot water rinse. Short time acid immersions can also be used to remove tenacious dirt prior to rinsing.

The extent and effectiveness of stripping or cleaning can then be evaluated 74 by analyzer 50. Analyzer 50 can be a device to conduct an elemental analysis such as an energy dispersive spectroscopy apparatus, a cross-sectional metallography device or the like. Other examples of analyzer 50 comprise a charge-coupled device or analyzer (CCD) camera that detects photon wavelengths and fluxes The CCD camera can be used to determine cleaning and stripping effectiveness.

Or analyzer 50 can be a profilometer to measure etch depth. Essentially, a profilometer measures surface roughness or profile. It provides a three dimensional topographical map of surface that permits determination of amount of coating removed by a given solution. For example, a Dektak® (Sloan Technology Corporation, 602 E. Montecito Street Santa Barbara, Calif. 93103) profilometer comprises sharp needles that are scanned across a surface in an X-Y raster pattern to measure vertical displacement or height. Atomic force and scanning tunneling microscopes (AFM's and STM's) are more refined suitable profilometers that measure heights of single atoms. An optical profilometer (Phase Shift Technologies, Inc.) uses light interference (constructive and destructive) to measure vertical displacement. An optical profilometer has a resolution between that of a Dektak® device and an STM.

Another suitable analyzer is an Eagle II Microfluorescence System (EDAX, Inc.), which uses X-rays to generate characteristic wavelength fluorescence that permits elemental identification to distinguish between coating and base metal. Another suitable analyzer 50 is based on "heat tint," which involves oxidizing an entire coupon at several hundred degrees Celsius for an hour or two and observing a color change of the coating (or base metal). The color change identifies the amount of remaining coating or indicates whether the base metal has been completely exposed.

In an embodiment of the method of the invention, an agitated and heated array of solutions from step 70 can be subjected to an evaluating step 76 to determine amount of removed coating or pH or metal concentration of the used solution. The analyzed array is then disassembled and rinsed 72 and analyzed according to step 74 to provide additional data to controller 48.

The steps of assembling 66, loading 68, agitating/heating 70, disassembling/rinsing and detecting/evaluating 74 can be reiterated to provide complete test results on an experimental space. For example, the method can be conducted with three iterations using three different contact well masks 16 to provide a test coupon base 14 according to FIG. 6.

Figure 10:
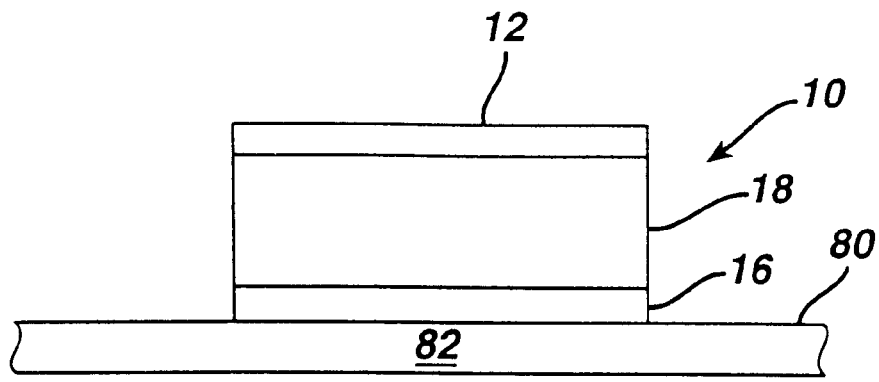
FIG. 10 is a schematic representation of an embodiment of the multilayer well assembly.
Figure 11:
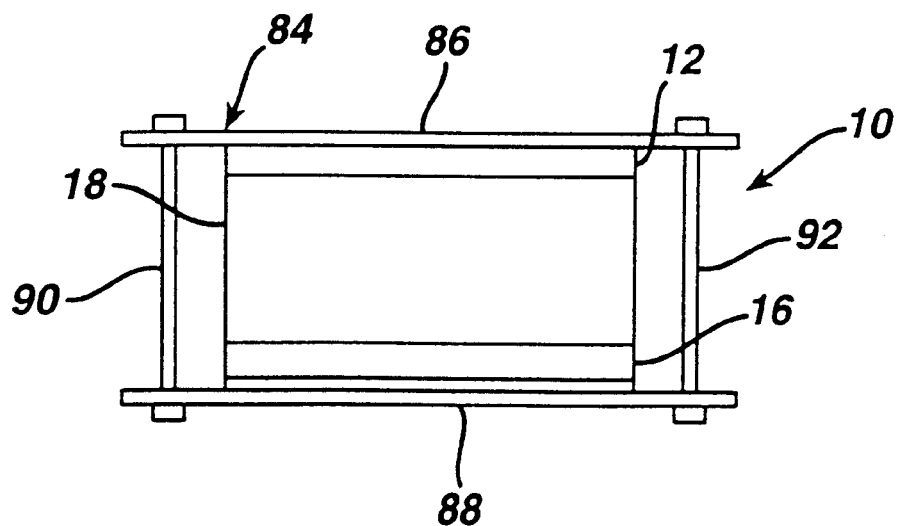
FIG. 11 is a schematic representation of another embodiment of the multi-layer well assembly.

FIGS. 10 and 11 are schematic representations of embodiments of the well assembly 10 of the invention. FIG. 10 shows the well assembly 10 including lid 20, resevoir array plate 18 and contact well mask 16. In the embodiment shown, the contact well mask 16 is mounted directly onto a surface 80 of a turbine engine part 82. In this embodiment, the surface 80 functions as the substrate for testing In FIG. 11, lid 20, resevoir array plate 18, contact well mask 16 and the metal coupon base 14 of the well assembly 10 are compressed together for processing by well clamp 84. Well clamp 84 consists of two opposing plates 86 and 88 secured together by bolts 90 and 92 to securely clamp together the well assembly 10 for testing after loading.

The method, array assembly and system of the invention utilize CHTS to rapidly screen and optimize solutions and processing conditions for stripping and cleaning of airfoil coatings. The invention provides significant increase in experimental speed for testing these solutions. The invention can be practiced with a single coupon base. The invention can provide a quick screening procedure for new coatings during development or after introduction into an engine. The invention can be used for simultaneous screening of non-destructive evaluation techniques on an array of partially to fully stripped/cleaned coatings. In one embodiment, the invention can be used directly on an airfoil surface instead of on a coupon specimen.

The array assembly of the invention can be configured as a standard 24 or 96-well plate or in a customized configuration as required by the application. The array assembly can be used in a variety of mixture experiments, such as in a single component acid diluted with water experiment, a mixtures of two or more acids experiment or an experiment with one or more acids with additives such as surfactants for increased surface wetting and/or inhibitors to protect the underlying base metal once the coating is removed.

These and other features will become apparent from the drawings and following detailed discussion, which by way of example without limitation describe a preferred embodiment of the present invention.

EXAMPLE

The invention is used in a CHTS process to select a best stripping solution from a combination of two acids, phosphoric acid (Phos) and hydrofluorosilicic acid (HFS), Plurafac® surfactant (a polyoxyalkylene condensate), and a Rodine® acid inhibitor. The base metal is a PtAl coated N5 (a nickel superalloy) coupon that has been heat treated for 47 hours near 2050° C. to simulate engine-run conditions.

A 96-Well multilayer well array assembly is used that has a Teflon® lid, plate and mask. The mask is a porous Teflon® material so that the array assembly can be compressably secured by a clamp as shown in FIG. 11. Prior to attaching the lid and clamping, the wells of the plate are loaded according to the solutions shown in the Table of FIG. 12. The lid is attached and the array assembly is clamped. The entire clamped assembly is placed on a rocker in an oven set to 70° C. A three-hole masking strategy is used so that times of 30, 60, and 120 minutes can be tried in each well and for each solution. After all the experiments, a profilometer is used to measure the etch depth for each solution. A solution's reactivity to removing coating is determined from the depth of the etch pit.

Results are reported in the table shown as FIG. 12. The table shows that the surfactant offers no improvement. The acid mixtures of columns 7, 8 and 10 are the most reactive as shown by the deepest etch pits. In column 8, row 8, the 20/20 Phos/HFS solution shows the most rapid removal of coating, however, at 120 minutes there is some base metal attack. The use of the Rodine inhibitor in the amount of 2–3% is found to stop base metal attack at 120 minutes. Hence, the solutions of column 10, rows 3 & 4 are selected as the best solutions.

While preferred embodiments of the invention have been described, the present invention is capable of variation and modification and therefore should not be limited to the precise details of the example. For example, the invention can be used to develop chemical etches for the semiconductor industry, for functionalizing tail groups of self-assembling monolayers (SAM's), for corrosion studies, for development of liquid based catalysts and in electrochemistry to (a) remove coatings, (b) deposit films and coatings, (c) electropolish a substrate, (d) develop new electrolytes for batteries, fuel cells, etc.

In another embodiment, the method and assembly are used to select a number of satisfactory solutions, which are then subjected to varying temperature, time periods, etc., to select optimize operational conditions.

The invention includes changes and alterations that fall within the purview of the following claims.

What is claimed is:

1. A combinatorial high throughput screening well array assembly, comprising:
   (A) a metal substrate;
   (B) a mask placed upon said substrate to define an array of wells upon said substrate; and
   (C) a reservoir array plate atop said mask to provide a reservoir for each of the wells to hold a candidate solution;
   wherein said mask defines an array of wells each having a prescribed contact area with said substrate, and a ratio of reservoir volume capacity to a contact area of wells of the array is determined by a molarity of a component of said candidate solution, a composition and a thickness of a coating to be stripped from said substrate; and
   wherein the substrate is a metal test coupon base.

2. The assembly of claim 1, wherein a volume capacity of said reservoir is determined by molarity change of said candidate solution as a function of coating to be removed.

3. The assembly of claim 1, wherein said mask defines an array of wells each having a prescribed contact area with said substrate and said mask is a replaceable mask that can be replaced by a different mask that defines a different contact area on said substrate from the contact area defined by said replaceable mask.

4. The assembly of claim 1, wherein the substrate is a metal test coupon base from a turbine engine part.

5. The assembly of claim 1, wherein the substrate is a region of a turbine engine part.

6. A combinatorial high throughput screening system, comprising said well array assembly of claim 1, and a reaction vessel to receive said well array assembly.

7. A combinatorial high throughput screening well array assembly, comprising:
   (A) a metal test coupon base;
   (B) a mask placed upon said a metal test coupon base to define an array of wells upon said substrate; and
   (C) a reservoir array plate atop said mask to provide a reservoir for each of the wells to hold a candidate solution;
   wherein said mask defines an any of wells each having a prescribed contact area with said metal teat coupon base and said mask is a replaceable mask that can be replaced by a different mask that defines a different contact area on said substrate from the contact area defined by said replaceable mask.

8. The assembly of claim 7, wherein the metal test coupon base is a region of a turbine engine part.

9. A combination high throughput screening system, comprising said well array assembly of claim 7, and a reaction vessel to receive said well array assembly.

* * * * *